(12) United States Patent
Nylander et al.

(10) Patent No.: US 8,768,334 B2
(45) Date of Patent: Jul. 1, 2014

(54) METHOD OF CONFIGURING A SMALL CELL RADIO BASE STATION

(75) Inventors: Tomas Nylander, Varmdo (SE); Tomas Hedberg, Stockholm (SE); Claes Andersson, Stockholm (SE); Jari Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 910 days.

(21) Appl. No.: 12/677,396

(22) PCT Filed: Oct. 22, 2007

(86) PCT No.: PCT/SE2007/050764
§ 371 (c)(1),
(2), (4) Date: Mar. 10, 2010

(87) PCT Pub. No.: WO2009/054759
PCT Pub. Date: Apr. 30, 2009

(65) Prior Publication Data
US 2010/0210258 A1    Aug. 19, 2010

(51) Int. Cl.
*H04W 16/00*    (2009.01)
(52) U.S. Cl.
USPC ........................................ 455/422.1; 455/436
(58) Field of Classification Search
USPC .................. 455/422.1, 436, 437, 453
See application file for complete search history.

(56) References Cited

U.S. PATENT DOCUMENTS

| | | | |
|---|---|---|---|
| 5,862,124 A | 1/1999 | Hottinen et al. | |
| 6,801,722 B1 * | 10/2004 | Webb et al. | 398/156 |
| 6,801,772 B1 * | 10/2004 | Townend et al. | 455/436 |
| 2006/0073837 A1 * | 4/2006 | Tanaka et al. | 455/453 |
| 2006/0079183 A1 | 4/2006 | Song et al. | |
| 2006/0121907 A1 * | 6/2006 | Mori et al. | 455/447 |
| 2007/0097939 A1 | 5/2007 | Nylander et al. | |
| 2007/0232313 A1 * | 10/2007 | Hosono et al. | 455/436 |
| 2008/0039141 A1 | 2/2008 | Claussen et al. | |

FOREIGN PATENT DOCUMENTS

| | | |
|---|---|---|
| EP | 1 657 950 A2 | 5/2006 |
| EP | 1 843 618 A2 | 10/2007 |
| JP | 6-350514 A | 12/1994 |
| JP | 10-500811 A | 1/1998 |
| JP | 11-355840 A | 12/1999 |
| JP | 2000-316180 A | 11/2000 |
| JP | 2006-109448 A | 4/2006 |
| WO | WO 2005/091667 A1 | 9/2005 |
| WO | WO 2007/052968 A1 | 5/2007 |

OTHER PUBLICATIONS

Notice of Allowance, JP Application No. 2010-529896, Jun. 15, 2011.
European Search Report Corresponding to European Patent Application No. 07 835 349; Dated: May 27, 2013; 3 Pages.
European Office Action Corresponding to European Patent Application No. 07 835 349; Dated: Jun. 6, 2013; 6 Pages.

* cited by examiner

*Primary Examiner* — Myron K Wyche
(74) *Attorney, Agent, or Firm* — Myers Bigel Sibley & Sajovec, PA

(57) ABSTRACT

In a method and a device a detection mechanism enabling a cellular radio system to detect deployment of two or more radio base stations having a small coverage area close to each other and configured to use the same scrambling code is provided. The detected information can be used as a trigger to automatically reconfigure one of the radio base stations having a small coverage area.

20 Claims, 3 Drawing Sheets

METHOD OF CONFIGURING A SMALL CELL RADIO BASE STATION

TECHNICAL FIELD

The present invention relates to a method, a device and a system for configuring the scrambling code for a small cell radio base station providing radio access in a cellular radio system.

BACKGROUND

Today, specification is ongoing in 3GPP for E-UTRAN (Evolved Universal Terrestrial Radio Access Network) that is the next generation of Radio Access Network (RAN). Another name used for E-UTRAN is the Long Term Evolution (LTE) Radio Access Network (RAN). A base station in this concept is called eNB (E-UTRAN NodeB). The studies also include the possibility to have an E-UTRAN base station to provide home or small area coverage for a limited number of users. The base station is termed HNB (Home eNodeB) in the LTE context but other terms exist.

In addition, development of a cellular radio system for providing home or small area Wideband Code Division Multiple Access (WCDMA) coverage for limited number of users using a small radio base station (RBS) is ongoing. Such a radio base station is providing a small coverage area, typically the home of a subscriber will provide normal WCDMA coverage for the end users and is connected to the radio network controller (RNC) typically using some kind of Internet Protocol (IP) based transmission link.

One alternative to connect the radio base station with a small coverage area to the RNC is to use fixed broadband access, e.g. some kind of a Digital Subscriber Line (xDSL) or a Cable. Another alternative is to use some kind of wireless broadband access, e.g. WiMAX.

Typically, a radio base station providing a small coverage area can for example be equipped with a WCDMA User Equipment (UE) receiver and/or a Global System for Mobile communication (GSM) UE receiver, which enables the radio base station to scan the overlaying WCDMA and GSM environment and to camp on WCDMA or GSM cells in order to read the relevant system information. A radio base station providing a small coverage area may however be deployed without a UE receiver in the radio base station.

A radio base station providing a small coverage area can be designed to be dynamically installed by the end users in a plug-and-play fashion without any operator intervention. Also, the cell created by the deployment of such a radio base station with a small coverage area may be created automatically and configured based on information provided by an UE receiver that is included in the radio base station. For example, an UE receiver of the radio base station can be set to scan the surrounding WCDMA and/or GSM environment, e.g. a number of GSM and/or WCDMA cells with related measurement information, and to report the scanned information including the relevant system information to the RNC to which the radio base station is connected to. Using the information provided from the radio base station with a small coverage area, the RNC then creates and configures the small cell.

For example, Location Area Identity, Cell Identity, Frequency, Scrambling Code and output power for the small cell can be selected and configured among many other information elements and settings. One difference between an ordinary, macro cell, and a small cell is that the location of macro cells is known and planned by the operators. The small cells, on the other hand, can be dynamically installed in any place by the end users by deployment of a radio base station with a small coverage area without any operator intervention. As a result two small cells can be installed very close to each other as the installation of small cells is not coordinated by anyone.

In one scenario two or more radio base stations having a small coverage area are deployed with overlapping coverage areas. A problem that may then arise is that a User Equipment may receive a signal from two or more radio base stations with small coverage areas, but the corresponding radio base stations may be too spaced apart to "hear" or detect each other.

This situation creates a problem as the two radio base stations with small coverage areas may be configured to use the same scrambling code and this would create disturbance in the UE receiving both these signals and trying to communicate with one of the radio base stations.

SUMMARY

It is an object of the present invention to provide an improved radio system, which reduces or eliminates the problems as set out above.

This object and others are obtained by the method, devices and system as set out in the appended claims.

Thus by providing a detection mechanism enabling a cellular radio system to detect deployment of two or more radio base stations having a small coverage area close to each other and configured to use the same scrambling code, the detected information can be used as a trigger to automatically reconfigure at least one of the radio base stations having a small coverage area.

Using the method and system as described herein it will be possible to dynamically detect and also dynamically reconfigure small cell radio base stations when multiple small cell radio base stations are installed close to each other and are configured to use the same scrambling code.

BRIEF DESCRIPTION OF THE DRAWINGS

The present invention will now be described in more detail by way of non-limiting examples and with reference to the accompanying drawings, in which.

DETAILED DESCRIPTION

Figure 1:
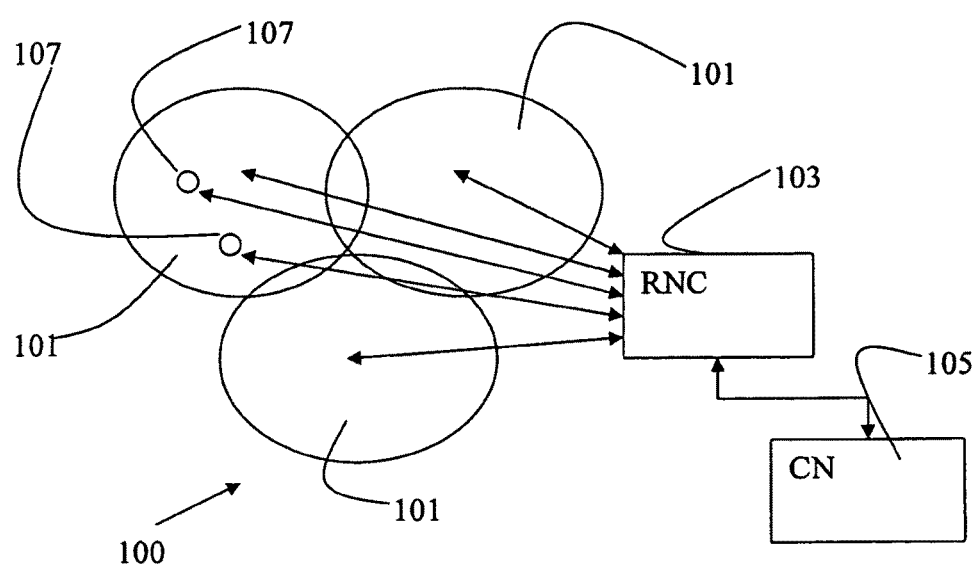
FIG. 1 is a view illustrating a cellular radio system comprising macro cells and small cells.

In FIG. 1, a general view of a cellular radio system 100 is shown. The system 100 comprises a number of macro cells 101 together covering a geographical area in which the system 100 provides radio access. Each cell 101 is associated with a radio base station, not shown, which communicates with a Radio Network Controller (RNC) 103. The RNC is in turn connected to a Core Network (CN) 105. In addition to the macro cells 101 there is also provided a number of small cells 107 within the macro cells 101. The small cells are formed by deployment of radio base stations having small coverage areas. The radio base stations having a small coverage area are end-user configurable and can be deployed by an end user wherever it is deemed appropriate. Typically such a radio base station with a small coverage area can be deployed at home or similar.

Figure 2:
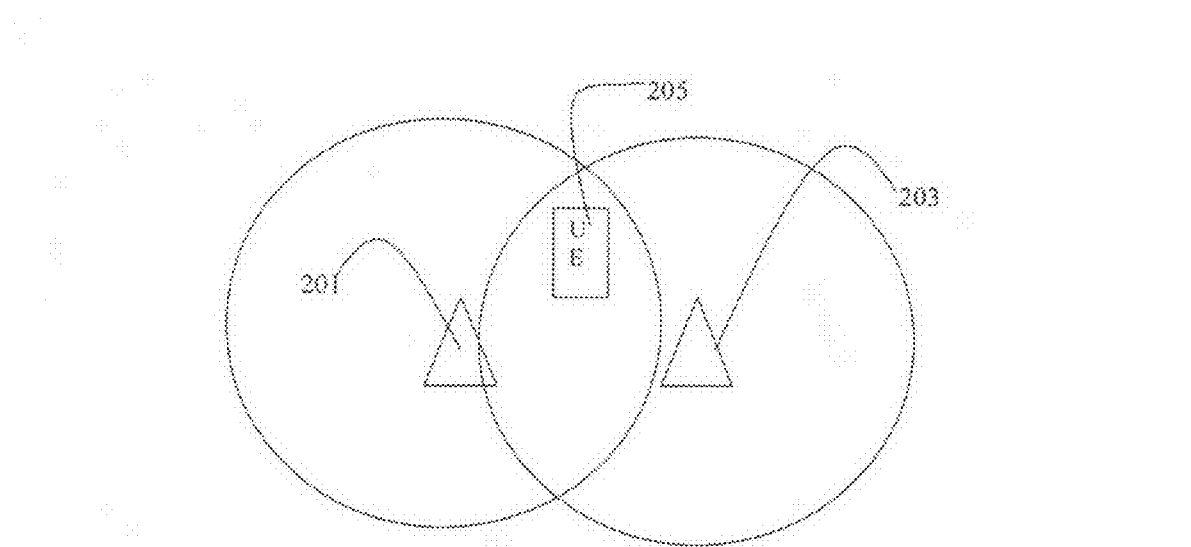
FIG. 2 is a view illustrating location of two small cell radio base stations.

As set out above a problem may arise if two or more such small cell radio base stations are deployed too close and configured with the same scrambling code. Such a scenario is depicted in FIG. 2. In FIG. 2 two radio base stations 201 and 203 have been installed close to each other so that the coverage area of the two radio base stations 201 and 203 at least partly overlap. If the two radio base stations 201 and 203 have been configured with the same scrambling code a User Equipment 205 located within reach from both radio base stations 201 and 203 can access the radio base stations 201 and 203 simultaneously, which is undesired since this could lead to severe interference.

In accordance with one embodiment of the present invention each radio base station 201, 203 having a small coverage area can be set to a specific mode such as an installation mode. In the installation mode, specified system information can be broadcasted enabling detection in the network that two or more radio base stations having a small coverage area are configured to use the same scrambling code.

The detection can for example be based on a UE trying to access the network simultaneously using two or more radio base stations having a small coverage area. The trigger mechanism to set a radio base station to installation mode can be any suitable event such as during an initial installation of a radio base station or an end user calling the operator customer service and indicates that there is a problem perceived with the radio base station. In one embodiment a supervision function can be included in the radio base station that indicates possible problems in the small cell configuration. In one embodiment the installation mode can be activated each time a radio base station with small coverage area is turned on and kept activated for a predefined time. This can be advantageous in case the radio base station has been moved. In accordance with another embodiment, the installation mode can be active continuously or alternatively be triggered periodically. In still another embodiment the installation mode can be activated from another network node, such as the RNC if for example customer complaint is received by the operator or a supervision function in the network detects possible problems.

In one exemplary embodiment, the installation mode is used when a UE is trying to perform some predetermined action e.g. Location Update or Attach once when detecting the radio base station with a small coverage area. For example, the following steps could be performed as part of the initial installation of the small cell radio base station. The small cell radio base station can be set to installation mode by the end user turning off the small cell radio base station and then turning it on again. In the same way a UE can be triggered to perform Attach by turning off the UE and then turning it on again.

Other possibility for turning off and on the UE is based on the small cell radio base station 201, 203 having a different Location Area Identity (LAI) and different Routing Area Identity (RAI) compared to the macro network as this can be needed for an Access Control mechanism anyhow. The principle is that whenever an UE detects a small cell and attempts to access it, it will read the LAI and RAI broadcasted as part of the system information in the small cell. As the LAI/RAI are different compared to the macro network, the upper mobility management layers in the UE will trigger Location Update and Routing Area Update procedures via the small cell. This will then create an access attempt towards the network and can then be used to detect multiple femto cells using the same scrambling code.

When any of these procedures is triggered by the upper layers in the UE, the RRC layer connection will be established. The RRC connection request will trigger the lower layers in the UE to perform a Random Access Channel (RACH) procedure on the Physical Random Access Channel (PRACH) channel. The basic principle of the RACH procedure is that the UE reads some relevant information in the system information such as System Information Block 6 (SIB6) and based on this information the UE will know how to perform the RACH procedure towards the network. The first part of the RACH procedure typically consists of the UE sending a preamble to the network on the PRACH channel. If the UE does not receive any response from the network, a power ramping method may be applied and the UE will increase the transmit power used for the next sending of the preamble.

The preamble is a short signal that typically consists of 4096 chips which can be 256 repetitions of the Hadamard codes of length of 16 chips. The SIB6 contains information about which of the 16 Hadamard codes defined for a scrambling code are allowed in that cell. The UE randomly selects one of the allowed Hadamard codes and it is used as the base for the preamble. In addition, the cell scrambling code is used to create the final preamble.

The RACH channel is divided into access slots and the UE selects one of these access slots based on the Access Class (AC) information stored in the (Universal) Subscriber Identity Module (U)SIM, i.e. the (U)SIM card that is installed in the UE and contains information about the Mobile subscription. In a typical WCDMA cellular radio network, there exists 16 different ACs and all UEs are randomly divided into the ACs 0-9 and the AC selected between 0 and 9 is stored in the (U)SIM. The AC 10 is used to indicate if emergency calls are allowed and the rest of the ACs, 11-15 are designated for operator and authority usage. Hence, the main principle is that UEs are normally randomly divided between the ACs and selection of access slots is made to further decrease the possibility of collisions i.e. that two UEs have selected the same signature and built the same preamble and belong to the same AC and have also selected the same access slot and then additionally transmit at exactly the same time.

Figure 3:
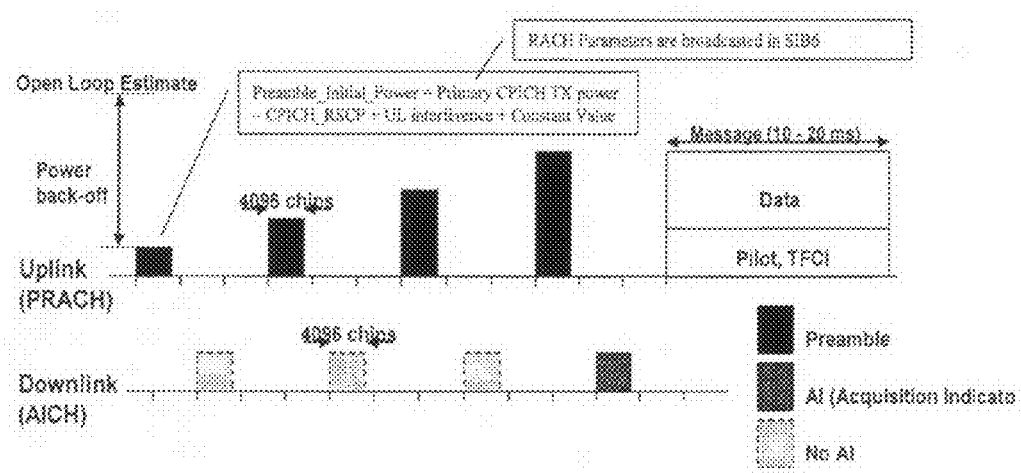
FIG. 3 is a view illustrating a RACH procedure in WCDMA.

The SIB6 also indicates different information for the initial transmission power used for sending of the preamble. The FIG. 3 shows the normal principle of the RACH procedure as standardized for WCDMA.

When in installation mode, the UE is set to perform the RACH procedure in a way that the preamble submitted by the UE is detected by two or more different small cell radio base stations configured to use the same scrambling code and that all small cell radio base stations submit the Acquisition Indicator (AI) on the AICH making the UE to submit the higher layer message so that for example two small cell radio base stations receive it and that the RNC controlling these two small cell radio base stations can detect the simultaneous access from different small cell radio base stations and in response thereto initiate a re-configuration of one of the small cell radio base stations, i.e. as a consequence of the detected multiple access.

In an exemplary embodiment the following settings may be used for the SIB6 when in installation mode. Only differences to normal mode of operation are described. The Primary CPICH transmission Power IE is set to indicate the maximum possible value or another high value and the Constant Value IE also set to indicate the maximum possible value or another high value to achieve long reach.

Figure 4:
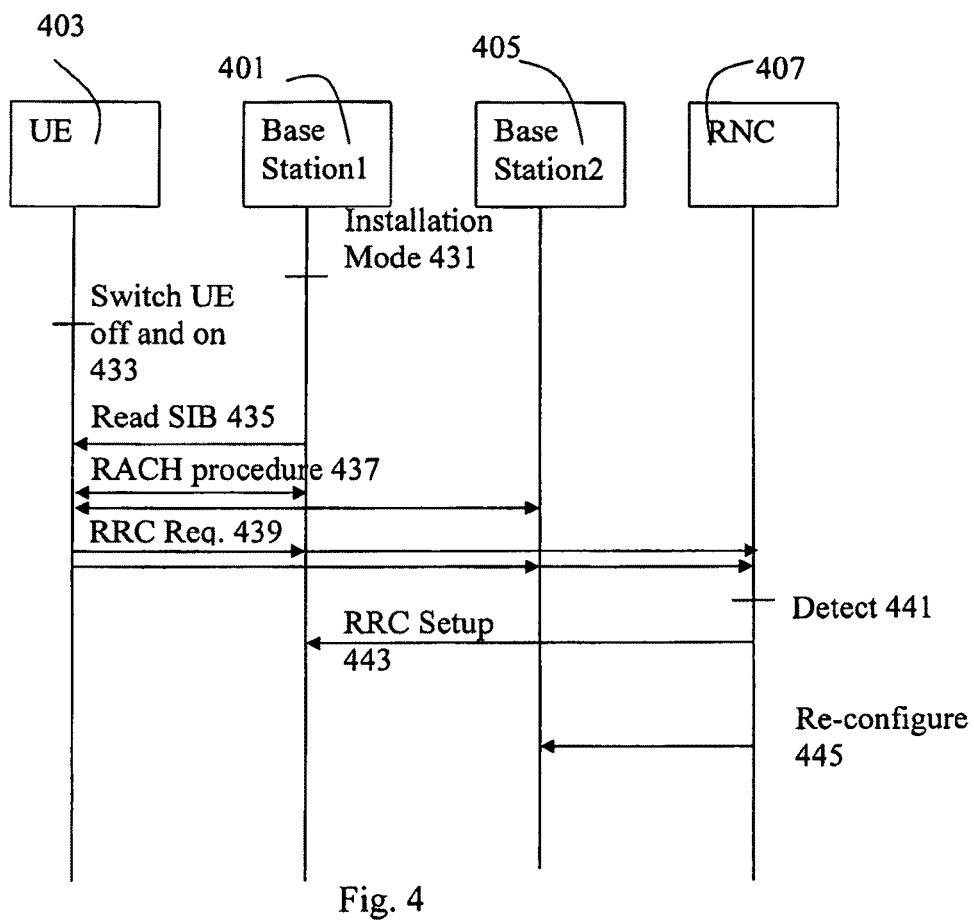
FIG. 4 is a flowchart illustrating steps performed in a cellular radio system when detecting use of the same scrambling code.

In FIG. 4, an exemplary procedure is shown that illustrates when a first small cell radio base station 401 is set to installation mode using any of the methods described herein and a UE 403 is turned off and on, i.e. a power cycle is performed in the vicinity of the small cell radio base station 401. In addition to the small cell radio base station 401 a second small cell radio base station 405 is also located within the range of the UE 403.

First in a step 431, the small cell radio base station 401 is set to installation mode by any suitable trigger event such as any one of the events set out above. For example in accordance with one embodiment an end user can actively participate in the installation procedure. For example during an initial installation of the small cell radio base station 401, the installation mode is automatically entered in the small cell radio base station 401 and additionally an end user may turn off and on an UE 403. In another embodiment, the installation mode can be activated until the end user(s) start(s) to make calls.

When the UE 403 is turned on, in a step 433, the small cell radio base station is already in the installation mode, as per step 431, and the UE 403, in a step 435 reads the relevant system information in the cell generated by the deployment of the small cell radio base station 401. This system information can include the SIB6 with special settings for the Installation mode. Next, the UE performs an Attach and/or Location Updating procedure and initiates a RACH procedure 437. The PRACH SI in the SIB6 indicates that the UE 403 is to send the initial preamble with a very high or a maximum possible transmission power. In response the UE 403 makes a transmission with the indicated transmission power.

In case the preamble is detected by another small cell radio base station, other than the first small cell radio base station 401, such as the small cell radio base station 405, both small cell radio base stations will send an AI in the AICH. The UE 403 will then in a step 439 send the RRC CONNECTION REQUEST after receiving the AI and also this message is received by both small cell radio base stations and are forwarded to an RNC 407 controlling the small cell radio base stations 401 and 405.

Next, the RNC 407 in a step 441 can detect that the same IMSI is trying to establish the RRC connection simultaneously or close in time via two different small cell radio base stations. The RNC then in a step 443 continues with the RRC connection setup via one of the small cell radio base stations, in this example 401. Also, in response to the detection in step 441, the RNC 407 in a step 445 initiates a change of the scrambling code for at least one of small cell radio base stations 401 and 405, in this example radio base station 405.

In the case IMSI is not used and instead TMSI is used, the RNC 407 can in such a situation detect 441 if the same TMSI is received simultaneously or close in time from two different small cell radio base stations configured with the same scrambling code.

Thus, if the RNC 407 detects 441 that the same scrambling code was used by two or more different small cell radio base stations with overlapping coverage, then as soon as possible one or more of these small cell radio base stations is set to be reconfigured with another free scrambling code, i.e. a scrambling code that have not been detected by the base stations during scanning of the macro network. The knowledge about free scrambling codes can also be based on a detection of unknown cells in the current frequency that UEs accessing a small cell radio base station can be configured to report to the corresponding RNC.

Using the method and system as described herein it will be possible to dynamically detect and also dynamically reconfigure small cell radio base stations when multiple small cell radio base stations are installed close to each other and are configured to use the same scrambling code. While the invention mostly has been described using terms of a WCDMA system a similar approach can be applied to other cellular radio system standards such as GSM and LTE. In the LTE case, there is no standardized central Radio Access Network (RAN) controller and the related functionality is included in the eNodeBs. This means that there is no standardized RAN node that could easily detect the multiple access from one UE on one or more small radio bases stations. However, the principles described in this invention can be used towards a non-standardized network node, when all small radio base stations report the different access attempts to the non-standardized network node and a small radio base station can be set to installation mode as described in this invention. In addition, the reporting of the access attempts can be controlled from the network, for example from the non-standardized network node.

The invention claimed is:

1. A method for configuring a scrambling code for a small cell radio base station that provides radio access to a cellular radio system, the method comprising:
    setting the small cell radio base station into an installation mode of operation in response to turning on the small cell radio base station or in response to detecting a possible problem with the small cell radio base station, where the small cell radio base station provides broadcast of cell parameters different than when the small cell radio base station is operating in a normal mode of operation, and wherein the small cell radio base station and at least one other small cell radio base station comprise respective end-user configurable radio base stations within a same larger cell;
    in a Radio Network Controller connected to the small cell radio base station, detecting that a User Equipment is accessing the cellular radio system via the small cell radio base station and the at least one other small cell radio base station; and
    in response to detecting that the User Equipment is accessing the cellular radio system via the small cell radio base station and the at least one other small cell radio base station, re-configuring the small cell radio base station to another scrambling code not used by any of said at least one other small cell radio base station.

2. The method according to claim 1, where one or more parameters related to initial transmission power are set to a high value when the small cell radio base station is operating in the installation mode.

3. The method according to claim 1, where the installation mode is triggered by a predefined event.

4. The method according to claim 3, where the installation mode is triggered from another network node.

5. The method according to claim 1, where the installation mode is deactivated after a predetermined time period.

6. A system comprising:
    a Radio Network Controller configured to:
    configure a scrambling code for a small cell radio base station that provides radio access to a cellular radio system,
    detect that a User Equipment is accessing the cellular radio system via the small cell radio base station and at least one other small cell radio base station, and
    re-configure the small cell radio base station to another scrambling code not used by any of said at least one other small cell radio base station, in response to detecting that the User Equipment is accessing the cellular radio system via the small cell radio base station and the at least one other small cell radio base station, wherein the small cell radio base station is configured to enter an installation mode of operation in response to turning on the small cell radio base station or in response to detecting a possible problem with the small cell radio base station, where the small cell radio base station provides broadcast of cell parameters different than when the small cell radio base station is operating in a normal mode of operation, and wherein the small cell radio base station and the at least one other small cell radio base station comprise respective end-user configurable radio base stations within a same larger cell.

7. A system comprising:
a small cell radio base station configured to:
enter an installation mode of operation in which the small cell radio base station provides broadcast of cell parameters different than when the small cell radio base station is operating in a normal mode of operation, wherein the cell parameters of the installation mode of operation comprise information enabling detection in a network that the small cell radio base station and at least one other small cell radio base station are configured to use a same scrambling code.

8. The system according to claim 7, where the small cell radio base station is adapted to set one or more parameters related to initial transmission power to a high value when the small cell radio base station is operating in the installation mode.

9. The system according to claim 7, where the installation mode is triggered in response to turning on the small cell radio base station or in response to detecting a possible problem with the small cell radio base station.

10. The system according to claim 9, where the installation mode is triggered from another network node.

11. The system according to claim 7, where the small cell radio base station is configured to return to a normal mode of operation after some predetermined time period.

12. A cellular radio system comprising a number of small cell radio base stations that provide radio access in the cellular radio system, the cellular radio system comprising:
a Radio Network Controller connected to a small cell radio base station of the number of small cell radio base stations, the Radio Network Controller being configured to detect that a User Equipment is accessing the cellular radio system via at least two small cell radio base stations simultaneously, and further configured to, in response to detecting that the User Equipment is accessing the cellular radio system via at least two small cell radio base stations simultaneously, re-configure at least one small cell radio base station, of the at least two small cell radio base stations, to another scrambling code not used by any of said at least two small cell radio base stations, wherein at least one of the small cell radio base stations is configured to enter into an installation mode of operation in which the small cell radio base station provides broadcast of cell parameters different than when the small cell radio base station is operating in a normal mode of operation, wherein the installation mode of operation is in response to turning on the small cell radio base station or in response to detecting a possible problem with the small cell radio base station, and wherein the small cell radio base station and at least one other small cell radio base station among the at least two small cell radio base stations comprise respective end-user configurable radio base stations within a same larger cell.

13. The cellular radio system according to claim 12, where parameters related to initial transmission power are set to a high value when the small cell radio base station is operating in the installation mode.

14. The cellular radio system according to claim 12, where the installation mode is triggered by a predefined event.

15. The cellular radio system according to claim 14, where the installation mode is triggered from another network node.

16. The system according to claim 12, wherein the installation mode is deactivated after a predetermined time period.

17. The method of claim 4, where the other node includes a Radio Network Controller.

18. The system of claim 10, where the other node includes a Radio Network Controller.

19. The method of claim 1, wherein detecting that the User Equipment is accessing the cellular radio system via the small cell radio base station and the at least one other small cell radio base station comprises:
detecting that the User Equipment is accessing the cellular radio system via the small cell radio base station and the at least one other small cell radio base station by detecting that a same International Mobile Subscriber Identity (IMSI) or Temporary Mobile Subscriber Identity (TMSI) is trying to establish a connection simultaneously from the small cell radio base station and the at least one other small cell radio base station.

20. The method of claim 1, wherein the cell parameters of the installation mode of operation comprise information enabling detection in a network that the small cell radio base station and the at least one other small cell radio base station are configured to use a same scrambling code.

* * * * *

UNITED STATES PATENT AND TRADEMARK OFFICE
CERTIFICATE OF CORRECTION

| | | |
|---|---|---|
| PATENT NO. | : 8,768,334 B2 | Page 1 of 1 |
| APPLICATION NO. | : 12/677396 | |
| DATED | : July 1, 2014 | |
| INVENTOR(S) | : Nylander et al. | |

It is certified that error appears in the above-identified patent and that said Letters Patent is hereby corrected as shown below:

In the Claims

In Column 8, Line 25, in Claim 16, delete "system" and insert -- cellular radio system --, therefor.

Signed and Sealed this
Third Day of March, 2015

Michelle K. Lee
*Deputy Director of the United States Patent and Trademark Office*